(12) United States Patent
Huang et al.

(10) Patent No.: US 7,412,405 B2
(45) Date of Patent: Aug. 12, 2008

(54) SYSTEM FOR PROPAGATING ADVERTISEMENTS FOR MARKET CONTROLLED PRESENTATION

(75) Inventors: Qingfeng Huang, San Jose, CA (US); Daniel H. Greene, Sunnyvale, CA (US); Juan Liu, Milpitas, CA (US); Hermann Calabria, Mountain View, CA (US)

(73) Assignee: Palo Alto Research Center, Inc., Palo Alto, CA (US)

( * ) Notice: Subject to any disclaimer, the term of this patent is extended or adjusted under 35 U.S.C. 154(b) by 566 days.

(21) Appl. No.: 11/213,271

(22) Filed: Aug. 26, 2005

(65) Prior Publication Data

US 2007/0050249 A1 Mar. 1, 2007

(51) Int. Cl.
*G06Q 30/00* (2006.01)
(52) U.S. Cl. ...................................................... 705/14
(58) Field of Classification Search .................... 705/14
See application file for complete search history.

(56) References Cited

U.S. PATENT DOCUMENTS

| | | | |
|---|---|---|---|
| 6,754,485 B1 * | 6/2004 | Obradovich et al. | 455/414.1 |
| 6,822,557 B1 * | 11/2004 | Weber | 340/425.5 |
| 2001/0042038 A1 | 11/2001 | Phatak | |
| 2002/0032035 A1 | 3/2002 | Teshima | |
| 2002/0194061 A1 | 12/2002 | Himmel et al. | |
| 2003/0003929 A1 | 1/2003 | Himmel et al. | |
| 2004/0117195 A1 * | 6/2004 | Bodin | 705/1 |
| 2004/0193488 A1 * | 9/2004 | Khoo et al. | 705/14 |
| 2004/0215526 A1 | 10/2004 | Luo et al. | |
| 2005/0097204 A1 * | 5/2005 | Horowitz et al. | 709/223 |

* cited by examiner

*Primary Examiner*—Calvin L. Hewitt, II
*Assistant Examiner*—Daniel M Sorkowitz
(74) *Attorney, Agent, or Firm*—Oliff & Berridge, PLC

(57) ABSTRACT

A method for propagating advertisement for market controlled presentation among communication devices over a communication network accessed by service providers and an advertising service is stored and executed as an application for use by network devices. The method includes receiving advertising requests and bids from potential advertisers, with each bid including a presentation slot specification and a proposed amount of payment for presentation. Ranking information is computed from the bid, with the ranking reflecting the financial value of propagation of the advertising request to the advertising service. The method also provides certification of the advertising request, with certification including a signature of the contents of the advertising request, the requested presentation slot, and the ranking information. The certified advertisement is then propagated over the communication network.

22 Claims, 4 Drawing Sheets

SYSTEM FOR PROPAGATING ADVERTISEMENTS FOR MARKET CONTROLLED PRESENTATION

CROSS REFERENCE TO RELATED APPLICATIONS

The following copending applications, U.S. application Ser. No. 11/213,107, filed Aug. 26, 2005, titled "Reverse Bidding for Trip Services", U.S. application Ser. No. 11/213,106, filed Aug. 26, 2005, titled "System to Manage Advertising and Coupon Presentation in Vehicles", and U.S. application Ser. No. 11/213,129, filed Aug. 26, 2005, titled "Vehicle Network Advertising System", are assigned to the same assignee of the present application. The entire disclosures of these copending applications are totally incorporated herein by reference in their entirety.

INCORPORATION BY REFERENCE

The following U.S. patent publications are fully incorporated herein by reference: U.S. Publication No. 2001/0042038 to Phatak ("Method and System for Conducting an Auction for Resources"); U.S. Publication No. 2002/0032035 to Teshima ("Apparatus and Method for Delivery of Advertisement Information to Mobile Units"); U.S. Publication No. 2002/0194061 to Himmel et al. ("Method and System for Request Based Advertising on a Mobile Phone"); U.S. Publication No. 2003/0003929 to Himmel et al. ("Method and System for Schedule Based Advertising on a Mobile Phone"); and U.S. Publication No. 2004/0215526 to Luo et al. ("Interactive Shopping and Selling Via a Wireless Network").

BACKGROUND

This disclosure relates generally to the advertisement of goods and services to mobile units and more specifically to certification of advertisers for propagation to mobile units on an ad hoc network.

Traditionally, roadside billboards have acted as a means for advertising goods and services to travelers, including drivers, walkers, and bikers. This advertising outlet has been frequently used by restaurants, automobile dealers, convenience stores, hotels, hospitals, and other service industries and manufacturers to provide information on services or goods available, as well as the location of the advertiser. These businesses depend on customers responding to roadside advertising or observing the business in close proximity to the roadway. The advent of on-board navigation systems makes it possible for travelers to access databases describing services many miles ahead, and consequently travelers can plan better use of roadside services. However, on board navigation also enables drivers to navigate short distances away from the main route to visit services, but this flexibility is not currently being well exploited. While it would be useful to have a method in which service businesses can interact with on board navigation systems and offer discounts, service-time guarantees, and better quality services, to induce travelers to choose their services, and in many cases to induce travelers to change their timing or venture further from their original planned routes to visit these services, to insure that the advertising received in the vehicle is limited to material of interest to the driver.

BRIEF SUMMARY

The disclosed embodiments provide examples of improved solutions to the problems noted in the above Background discussion and the art cited therein. There is shown in these examples an improved method for propagating advertisement for market controlled presentation among communication devices over a communication network accessed by service providers and an advertising service. The method is stored and executed as an application for use by network devices. The method includes receiving advertising requests and bids from potential advertisers, with each bid including a presentation slot specification and a proposed amount of payment for presentation. Ranking information is computed from the bid, with the ranking reflecting the financial value of propagation of the advertising request to the advertising service. The method also provides certification of the advertising request, with certification including a signature of the contents of the advertising request, the requested presentation slot, and the ranking information. The certified advertisement is then propagated over the communication network.

In another embodiment there is provided a system for propagating advertisement for market controlled presentation among communication devices over a communication network accessed by service providers and an advertising service, with the system stored and executed as an application for use by network devices. The system includes an advertising input module for receiving advertising requests from an advertiser and bids associated with the advertising requests. An advertisement authentication and encryption module encrypts the advertising request with an advertiser identification key. Central advertisement management and accounting module provides certification of the advertising requests. The certified advertising requests are distributed to a selected vehicle population under a predetermined policy by an advertising propagation module. For billing purposes, a transaction accounting and management module receives response records from participating vehicles in the network and transmits the response records to the central advertisement management and accounting module.

In yet another embodiment there is disclosed a system for propagating advertisement for market controlled presentation among communication devices over a communication network accessed by service providers and an advertising service. The system is stored and executed as an application for use by network devices. The system includes the capability for receiving advertising requests from advertisers, with each advertising request including bids from the advertiser for each advertising request submitted. The bid may include one or more presentation slot specifications and a proposed amount of payment for presentation. The system also includes capability for computing ranking information from the submitted bids, with the ranking reflecting the financial value of propagation of an advertising request to the advertising service. Certification is provided for the advertising requests, with certification including a signature of the contents of the certification request and the ranking information. Only certified advertising requests may be propagated over the communication network.

In yet another embodiment, there is disclosed a computer-readable storage medium having computer readable program code embodied in the medium causing the computer to perform method steps for reverse bidding of trip services among mobile communication devices over a communication network accessed by service providers and an advertising service. The method is stored and executed as an application for use by network devices. The method includes receiving advertising requests and bids from potential advertisers, with each bid including a presentation slot specification and a proposed amount of payment for presentation. Ranking information is computed from the bid, with the ranking reflecting the financial value of propagation of the advertising request to the advertising service. The method also provides certification of the advertising request, with certification including a signature of the contents of the advertising request, the requested presentation slot, and the ranking information. The certified advertisement is then propagated over the communication network.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

The method and system described herein deliver advertising and coupons to vehicles using a mobile ad hoc network. The advertising is highly restricted, and may only be presented during certain "presentation slots" in vehicles. An economic mechanism such as an auction is used to choose which advertisements among competing advertisements will be delivered during the presentation slots. Advertising based on presentation slots and auctions is described more fully in U.S. application Ser. No. 11/213,106, filed Aug. 26, 2005, titled "System to Manage Advertising and Coupon Presentation in Vehicles". Rather than relying on an on-line connection to an advertising server, the discussion below is directed with implementing such a system in a network that relies on ad hoc propagation of advertising.

A market-based presentation slot advertising system for delivery of advertising and coupons to vehicles using a mobile ad hoc network has several challenges. Among them is the necessity of preventing arbitrary advertisers from flooding the propagation network with useless advertisements. It also would be useful to enable vehicles to choose the most desired advertisement according to a market mechanism and to complete the transaction and charging the advertiser for a successful presentation without an on-line connection to an advertising service. The system and method described herein accomplish these objectives through use of a certification record and a response record.

Figure 1:
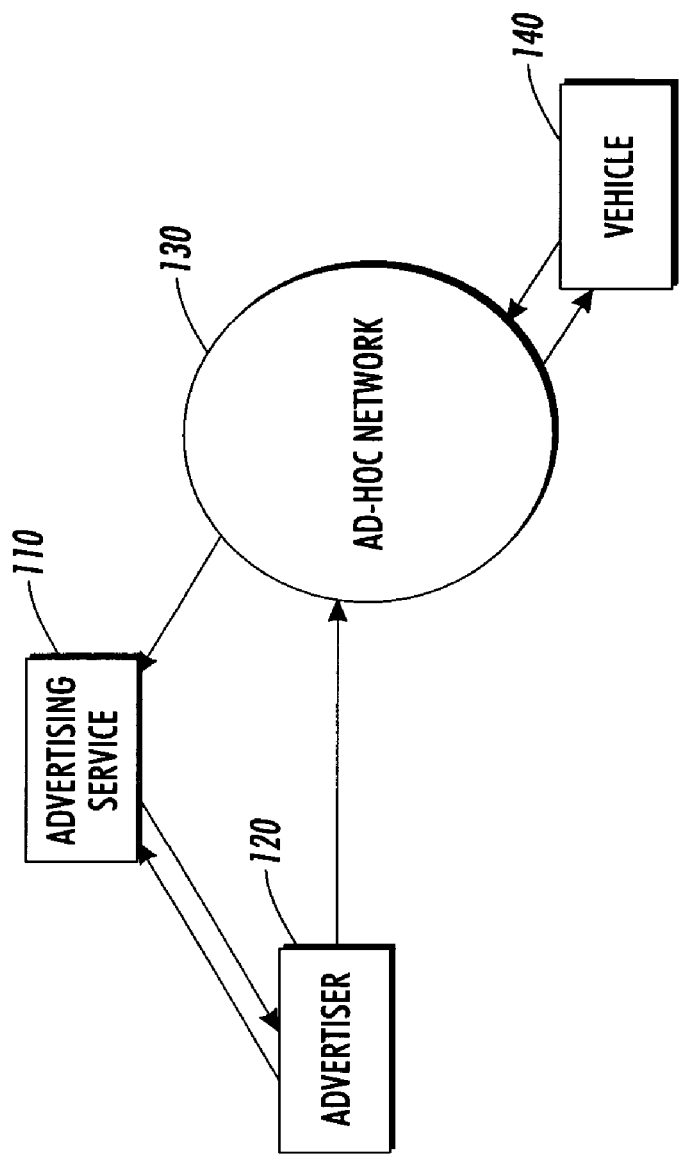
FIG. 1 illustrates an example embodiment of the system for propagating advertisements for market controlled presentation in an ad hoc advertising network.

In the following description numerous specific details are set forth in order to provide a thorough understanding of the system and method. It would be apparent, however, to one skilled in the art to practice the system and method without such specific details. In other instances, specific implementation details have not been shown in detail in order not to unnecessarily obscure the present invention. Referring to FIG. 1, the schematic diagram illustrates an example embodiment of the system for propagating advertisements for market-controlled presentation in an ad hoc advertising network. Before an advertiser can launch an advertisement into the propagation network 130, the advertiser 120 must contact an advertising service 110 and obtain a certification record that both authorizes propagation of the advertisement and encodes information that can be used to rank the advertisement with competing advertisements. The advertisement presented to the advertising system by the advertiser 120 may be in the form of text or image and could include special offers, such as coupons or discounts. The advertiser also may present a bid to the system. The details of the bid may depend on the economic mechanism that is used, but would usually specify a 'presentation slot', and some indication of what the advertiser will pay for a successful advertisement presentation. A presentation slot consists of a particular circumstance for which advertisements may be presented to a vehicle user. For example, an advertiser might bid on the "low gas warning" presentation slot, bidding $0.50, indicating that it will pay one dollar when a driver responds to the ad by driving to the gas station. The text of the advertisement may be "Unleaded regular gas $1.80, after a $0.20/gallon discount to the recipient if this message, use exit 25."

When advertising service 110 certifies the advertisement, part of the certification may be a signature of the contents of the certification request, including such things as content of the advertisement and the presentation slot that is requested. This signature protects the advertisement from tampering when it is in transit to the vehicle. The certification also includes ranking information that is computed from the bid. So, in the case of the gasoline example, the ranking information may be the bid itself, in this case $0.50. This corresponds to a simple auction, where slots are awarded to the advertisers that are willing to pay the most per response. More complex auctions may rank bidders according to an estimate of the revenue, that is, the product of the probability of response with the amount bid. In such an auction, the advertiser would compute this estimate and include it in the certification record. One purpose of the certification step is to insure that only reasonable effective advertisements are propagated in the network. For this reason, the advertising service will likely certify advertisements for a limited period of time, and observe the rate of response to the advertisements. If this rate drops, then the advertising service can refuse to certify the advertisement, or in the case of more complex auctions, adjust the ranking so the advertisement is less likely to be presented.

Propagation of the advertisement through network 130 is governed by targeting information that is supplied by the advertiser, and by the geography and traffic loads that the advertisement encounters as it is propagated. For example, in the case of the gasoline advertisement, the advertiser may wish to target only the southbound lanes of a nearby highway, and northwards for five miles or until 250 vehicles are reached. Vehicle condition and environmental information are used to govern the presentation of the advertisement and advertisers can be charged by verified successful presentation. For instance, sensors in a vehicle sense a low gas level. All advertisements available in the vehicle that have requested presentation in the "low gas warning" slot are ranked, and the top ranking advertisements are presented to the driver at the time of the warning. If driver 140 responds to an advertisement by either selecting the advertisement to obtain more information or driving to the place of business described in the advertisement, then a response record is generated and propagated back to advertising service 110. When advertising service 110 receives a response record, it allows the advertising service to charge for the advertisements. Together, the certification record and the response record allow the vehicle to implement market-based presentation slot advertising without an online connection.

Various computing environments may incorporate capabilities for supporting an intelligent transportation network. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Figure 2:
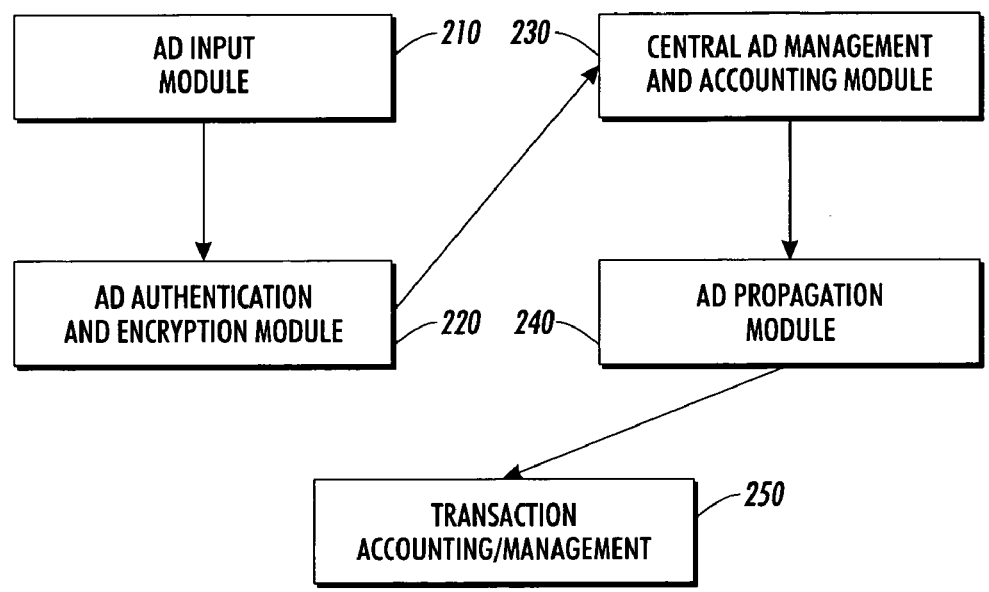
FIG. 2 illustrates an example embodiment of the computing architecture for a system for propagating advertisements for market controlled presentation.

Turning now to FIG. 2, one embodiment of a computing architecture for a system for propagating advertisements for market-controlled presentation is illustrated. Here, ad input module 210 receives a proposed advertisement, which may be in the form of text or image and may include special offers, such as discounts or coupons. The advertiser also presents a bid, which usually specifies a presentation slot and an indication of what the advertiser will pay for a successful ad presentation. The advertiser may also provide targeting information, which will be utilized in propagation of the ad in a vehicle network. Ad authentication and encryption module 220 encrypts the input data with the client key and sends the input data with client key and authenticates the advertisement request to ensure that it has been submitted from a legitimate client of the advertising service. The encrypted information is provided to central ad management and accounting module 230, which validates and certifies the input (including advertisement content and requested presentation slots with bids), reviews the ad content and requested presentation slot and provides a ranking computed from the bid. The certified ad is then sent to ad propagation module 240. Central ad management and accounting module 230 also stores the certified ad in a database, tracks the response records associated with specific ads and bills the advertiser for successful ad presentation. Ad propagation module 240 distributes the certified ad to a selected vehicle population, which is determined by targeting information supplied by the advertiser and by geography and traffic loads. Transaction accounting and management module 250 receives response records from participating vehicles in the network and also sends the data to central ad management module for billing purposes.

To illustrate this, a participating restaurant manager may submit a coupon for a 20% discount with an instruction to propagate the coupon within two miles of the restaurant with an agreement to pay $0.10 for each successful referral (e.g. visual presentation or cashing of the coupon). Authentication module 220 encrypts the data with the restaurant identification information and sends it to ad management module 230. Ad management module 230 finds that the expected profit from this coupon is higher that the offer from those of other restaurants in the area and decides to deliver the coupon into the network (through ad propagation module 240) with higher priority. The area of propagation may be slightly reduced to a 1.5 mile radius due to historical knowledge that the successful acceptance rate beyond a radius of 1.5 mile is low and also that other coupons could more effectively use the advertising space in those areas. Some drivers in the targeted area pick up the coupon and drive to the restaurant for dinner. The drive to events are recorded by transaction management module 250 and are sent to ad management module 230 later for the purpose of billing support.

Figure 3:
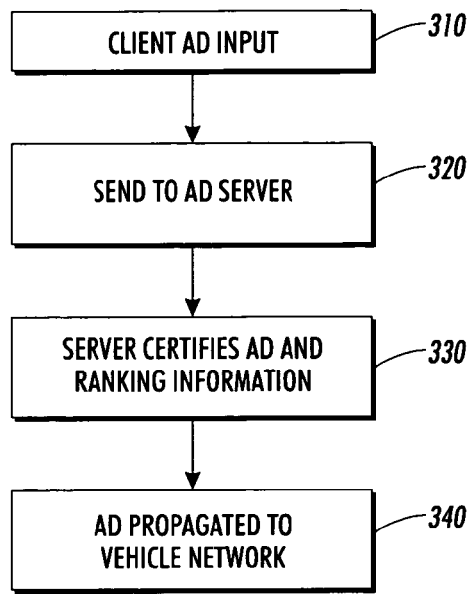
FIG. 3 is a flowchart illustrating an embodiment of the method for advertisement propagation in mobile vehicles.

Turning now to FIG. 3, the flowchart illustrates an embodiment of the method for advertisement propagation in mobile vehicles. Client ad input is received at 310 and will include not only the image, text, or special offers of the ad, but also a bid specifying a presentation slot and an indication of what the advertiser will pay for a successful presentation. This information, which may be encrypted, is transmitted to the ad server at 320, which certifies the ad and ranking information at 330. Part of the certification is a signature of the contents of the certification request, including such items as content of the advertisement and the presentation slot that is requested. This signature protects the advertisement from tampering when it is in transit to a vehicle. The certification also includes ranking information that is computed from the bid to establish a priority among bidders. The certification may be effective for a limited period of time or may be limited by the rate of response to the advertisement. The certified ad is propagated to the vehicle network at 340 under a predetermined policy developed from targeting information supplied by the advertiser, and by geography and traffic loads that the advertisement encounters as it is propagated. Vehicle condition and environmental information may also be used to govern the presentation of the advertisement.

Figure 4:
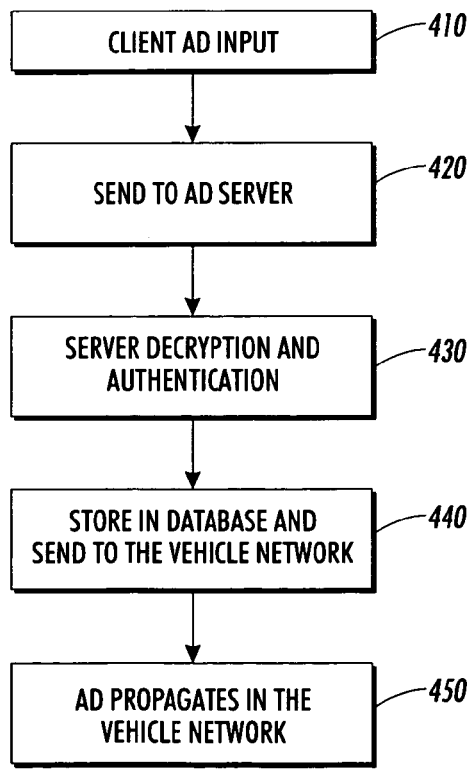
FIG. 4 is a flowchart illustrating another embodiment of the method for advertisement propagation in mobile vehicles.

Turning now to FIG. 4, the flowchart illustrates another embodiment of the method for advertisement propagation in mobile vehicles. At 410 client ad input is received, as in item 310 in FIG. 3. At 420 the ad is encrypted and sent to the ad server. At 430 the server decrypts and authenticates the ad to ensure that only ads from legitimate clients are accepted for presentation on the network. The authenticated ad is stored in a database, certified, and sent to the vehicle network at 440. At 450 the ad is propagated through the vehicle network as described in FIG. 3 at 340.

Figure 5:
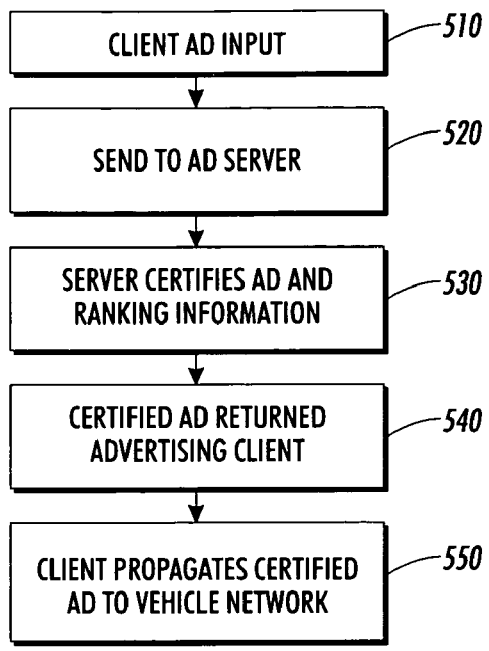
FIG. 5 is a flowchart illustrating an embodiment of the method for advertisement propagation in mobile vehicles in which the advertiser initiates propagation.

Turning now to FIG. 5, the flowchart illustrates an embodiment of the method for advertisement propagation in mobile vehicles in which the advertiser initiates propagation. Client ad input is received at 510 and will include not only the image, text, or special offers of the ad, but also a bid specifying a presentation slot and an indication of what the advertiser will pay for a successful presentation. This information, which may be encrypted, is transmitted to the ad server at 520, which certifies the ad and ranking information at 530. Part of the certification is a signature of the contents of the certification request, including such items as content of the advertisement and the presentation slot that is requested. This signature protects the advertisement from tampering when it is in transit to a vehicle. The certification also includes ranking information that is computed from the bid to establish a priority among bidders. The certification may be effective for a limited period of time or may be limited by the rate of response to the advertisement. The certified ad is returned to the advertising client at 540. At 550 the client may choose target area(s)

and time of delivery before propagating the certified ad to the vehicle network under a predetermined or combined policy. In this case the targeting selections may not be changed after certification. Alternatively, the client may determine the scope and time of delivery after certification.

Figure 6:
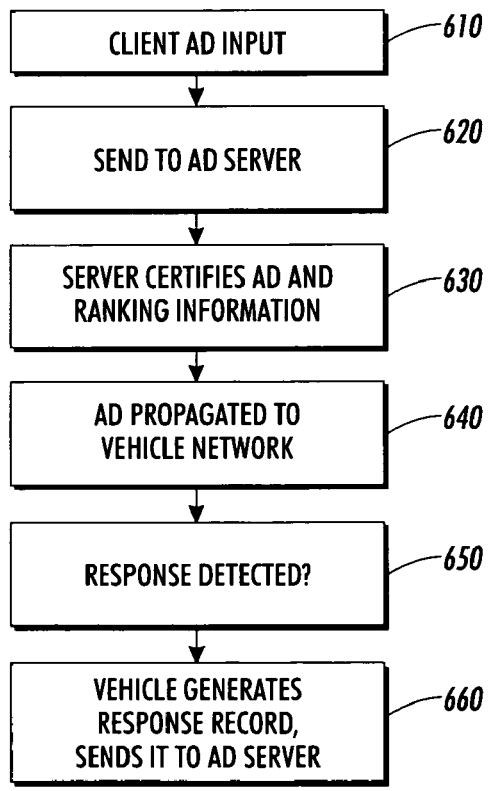
FIG. 6 is a flowchart illustrating an embodiment of the method for advertisement propagation in mobile vehicles in which a response record is included.

Turning now to FIG. 6, a flowchart illustrates an embodiment of the method for advertisement propagation in mobile vehicles in which a response record is included. Client ad input is received at 610 and will include not only the image, text, or special offers of the ad, but also a bid specifying a presentation slot and an indication of what the advertiser will pay for a successful presentation. This information, which may be encrypted, is transmitted to the ad server at 620, which certifies the ad and ranking information at 630. Part of the certification is a signature of the contents of the certification request, including such items as content of the advertisement and the presentation slot that is requested. This signature protects the advertisement from tampering when it is in transit to a vehicle. The certification also includes ranking information that is computed from the bid to establish a priority among bidders. The certification may be effective for a limited period of time or may be limited by the rate of response to the advertisement. The certified ad is propagated to the vehicle network at 640 under a predetermined policy developed from targeting information supplied by the advertiser, and by geography and traffic loads that the advertisement encounters as it is propagated. Vehicle condition and environmental information may also be used to govern the presentation of the advertisement. At 650 a response is detected from a receiving vehicle. The response may be in the form of a click from the user interface or a drive-to event. The vehicle generates a response record at 660 and sends it to the ad server, which may save the record for billing purposes. The response record provides the coupon identification and associated response event type, and possibly time and location for verification and auditing purposes.

While the present discussion has been illustrated and described with reference to specific embodiments, further modification and improvements will occur to those skilled in the art. For example, the server may combine or package multiple advertisements or coupons or both while providing certification, or mechanisms may be added during propagation to the network to combine or package multiple coupons in real-time. Additionally, "code" as used herein, or "program" as used herein, is any plurality of binary values or any executable, interpreted or compiled code which can be used by a computer or execution device to perform a task. This code or program can be written in any one of several known computer languages. A "computer," as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed:

1. A method for propagating advertisement for market controlled presentation among communication devices over a communication network, wherein the communication network is accessed by service providers and an advertising service, the method stored and executed as an application for use by network devices, the method comprising: receiving at least one advertising request from an advertiser, wherein said advertising request includes at least one member selected from the group comprising text material, image material, coupons, and discounts; receiving at least one bid from an advertiser for each said advertising request submitted, wherein said bid includes at least one presentation slot specification and a proposed amount of payment for presentation, wherein said presentation slot consists of a particular circumstance for which advertisements may be presented to a vehicle user; computing ranking information from said at least one bid, wherein said ranking reflects the financial value of propagation of said at least on advertising request to the advertising service; providing certification of said at least one advertising request, wherein certification includes a signature of the contents of said advertising request, said at least one requested presentation slot, and said ranking information; and propagating at least one certified advertising request over the communication network using the ranking information from the certification.

2. The method for propagating advertisement for market controlled presentation among communication devices according to claim 1, wherein said advertising request is encrypted.

3. The method for propagating advertisement for market controlled presentation among communication devices according to claim 2, further comprising decrypting said advertising request.

4. The method for propagating advertisement for market controlled presentation among communication devices according to claim 3, further comprising authenticating said advertising request, wherein authenticating includes verifying that said advertising request was submitted from a client of the advertising service.

5. The method for propagating advertisement for market controlled presentation among communication devices according to claim 4, further comprising storing at least one authenticated advertisement in a database.

6. The method for propagating advertisement for market controlled presentation among communication devices according to claim 1, wherein said certification is effective for a specified period of time.

7. The method for propagating advertisement for market controlled presentation among communication devices according to claim 1, wherein propagating is performed under a predetermined policy developed from at least one member selected from the group consisting of targeting information provided by said advertiser, geography, vehicle condition, environmental information, and traffic loads that said advertisement encounters as it is propagated.

8. The method for propagating advertisement for market controlled presentation among communication devices according to claim 1, further comprising returning at least one certified advertisement to said advertiser.

9. The method for propagating advertisement for market controlled presentation among communication devices according to claim 8, further comprising specification by said advertiser of at least one target area and time of delivery for said certified advertisement.

10. The method for propagating advertisement for market controlled presentation among communication devices according to claim 1, further comprising detecting a response to said certified advertising request from a receiving vehicle user.

11. The method for propagating advertisement for market controlled presentation among communication devices according to claim 10, further comprising generating a response record, wherein said response record includes at least one member selected from the group consisting of coupon identification, associated response event type, and time and location of said response.

12. A system for propagating advertisement for market controlled presentation among communication devices over a communication network, wherein the communication network is accessed by service providers and an advertising service, the system stored and executed as an application for use by network devices, the system comprising: means for receiving at least one advertising request from an advertiser, wherein said advertising request includes at least one member selected from the group comprising text material, image material, coupons, and discounts; means for receiving at least one bid from an advertiser for each said advertising request submitted, wherein said bid includes at least one presentation slot specification and a proposed amount of payment for presentation, wherein said presentation slot consists of a particular circumstance for which advertisements may be presented to a vehicle user; means for computing ranking information from said at least one bid, wherein said ranking reflects the financial value of propagation of said at least one advertising request to the advertising service; means for providing certification of said at least one advertising request, wherein certification includes a signature of the contents of the certification request and said ranking information; and means for propagating at least one certified advertising request over the communication network using the ranking information from the certification.

13. The system for propagating advertisement for market controlled presentation among communication devices according to claim 12, wherein said advertising request includes at least one member selected from the group comprising test material, image material, coupons, discounts, and targeting information.

14. The system for propagating advertisement for market controlled presentation among communication devices according to claim 13, wherein said targeting information includes at least one target area and time of delivery for said certified advertising request.

15. The system for propagating advertisement for market controlled presentation among communication devices according to claim 12, wherein said bid includes at least one presentation slot specification and a proposed amount of payment for presentation, wherein said presentation slot consists of a particular circumstance for which advertisements may be presented to a vehicle user.

16. The system for propagating advertisement for market controlled presentation among communication devices according to claim 15, wherein said certification of said at least one advertising request includes at least one member selected from the group comprising validating said advertising request, reviewing the content of said advertising request and requested presentation slot, and providing a ranking computed from said bid.

17. The system for propagating advertisement for market controlled presentation among communication devices according to claim 16, wherein said ranking reflects the financial value of propagation of said at least one advertising request.

18. The system for propagating advertisement for market controlled presentation among communication devices according to claim 12, said certification is effective for a specified period of time.

19. The system for propagating advertisement for market controlled presentation among communication devices according to claim 12, wherein said response record includes at least one member selected from the group consisting of coupon identification, associated response event type, and time and location of said response.

20. The system for propagating advertisement for market controlled presentation among communication devices according to claim 12, wherein said predetermined policy is developed from at least one member selected from the group consisting of targeting information provided by said advertiser, geography, vehicle condition, environmental information, and traffic loads that said advertisement encounters as it is propagated.

21. The system for propagating advertisement for market controlled presentation among communication devices according to claim 12, wherein said certification time is dependent upon the frequency of responses to said advertisement.

22. A computer-readable storage medium having computer readable program code embodied in said medium which, when said program code is executed by a computer causes said computer to perform method steps for reverse bidding of trip services among mobile communication devices over a communication network, wherein the communication network is accessed by service providers and an advertising service, said method comprising: receiving at least one advertising request from an advertiser, wherein said advertising request includes at least one member selected from the group comprising text material, image material, coupons, and discounts; receiving at least one bid from an advertiser for each said advertising request submitted, wherein said bid includes at least one presentation slot specification and a proposed amount of payment for presentation, wherein said presentation slot consists of a particular circumstance for which advertisements may be presented to a vehicle user; computing ranking information from said at least one bid, wherein said ranking reflects the financial value of propagation of said at least one advertising request to the advertising service; providing certification of said at least one advertising request, wherein certification includes a signature of the contents of the certification request and said ranking information; and propagating at least one certified advertising request over the communication network using the ranking information from the certification.

* * * * *

UNITED STATES PATENT AND TRADEMARK OFFICE
CERTIFICATE OF CORRECTION

| | |
|---|---|
| PATENT NO. | : 7,412,405 B2 |
| APPLICATION NO. | : 11/213271 |
| DATED | : August 12, 2008 |
| INVENTOR(S) | : Qingfeng Huang et al. |

It is certified that error appears in the above-identified patent and that said Letters Patent is hereby corrected as shown below:

On Title page Item [73], please change "Palo Alto Research Center, Inc." to --Palo Alto Research Center Incorporated--.

Signed and Sealed this

Thirtieth Day of September, 2008

JON W. DUDAS
*Director of the United States Patent and Trademark Office*